United States Patent
Jänicke et al.

(10) Patent No.: US 12,322,935 B2
(45) Date of Patent: Jun. 3, 2025

(54) COMPRESSED GAS SWITCH

(71) Applicant: SIEMENS ENERGY GLOBAL GMBH & CO. KG, Munich (DE)

(72) Inventors: Lutz-Rüdiger Jänicke, Mahlow (DE); Jens Schimmelpfennig, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 293 days.

(21) Appl. No.: 17/893,293

(22) Filed: Aug. 23, 2022

(65) Prior Publication Data
US 2024/0072522 A1 Feb. 29, 2024

(51) Int. Cl.
*H02B 13/045* (2006.01)
*H02B 13/055* (2006.01)

(52) U.S. Cl.
CPC ......... *H02B 13/055* (2013.01); *H02B 13/045* (2013.01)

(58) Field of Classification Search
CPC .... H02B 13/055; H02B 13/045; H01H 33/90; H01H 33/91; H01H 33/56; H01H 2033/907
USPC .................. 218/1, 55–57, 59, 61, 68, 79–80
See application file for complete search history.

(56) References Cited

U.S. PATENT DOCUMENTS

| | | | |
|---|---|---|---|
| 3,965,318 A | 6/1976 | Beier | |
| 4,146,763 A | 3/1979 | Handke | |
| 4,237,356 A * | 12/1980 | Ragaller | H01H 33/903 218/66 |
| 4,450,330 A * | 5/1984 | Zuckler | H01H 33/91 218/59 |
| 4,633,049 A * | 12/1986 | Pinnekamp | H01H 33/901 218/59 |
| 5,723,839 A * | 3/1998 | Kozawa | H01H 33/02 218/43 |
| 6,515,248 B2 * | 2/2003 | Imamura | H01H 33/91 218/43 |

(Continued)

FOREIGN PATENT DOCUMENTS

| | | |
|---|---|---|
| DE | 2248116 A1 | 4/1974 |
| DE | 2540315 A1 | 3/1977 |
| FR | 2867604 A1 | 9/2005 |

OTHER PUBLICATIONS

PCT International Search Report and Written Opinion of International Searching Authority mailed Oct. 9, 2023 corresponding to PCT International Application No. PCT/US2023/069596 filed Jul. 4, 2023.

*Primary Examiner* — William A Bolton

(57) ABSTRACT

A switch, includes electrical contacts separated by a contact gap, a tubular guide disposed around at least one of the electrical contacts axially movable between an open position retracted from the contact gap and a closed position bridging the contact gap, a blast cylinder disposed radially outward of the tubular guide and defining a compression volume therebetween, the blast cylinder axially movable in coordination with the tubular guide between the open position and the closed position, an isolating ring coupled to a tubular guide end, and a blast cylinder bottom ring coupled to a blast cylinder end, the blast cylinder bottom ring and the isolating ring configured to engage each other to form a gas seal to prevent a gas from exiting the contact gap into the compression volume when the blast cylinder and the tubular guide are moved to the closed position.

19 Claims, 4 Drawing Sheets

(56) References Cited

U.S. PATENT DOCUMENTS

| | | | | |
|---|---|---|---|---|
| 8,674,253 | B2* | 3/2014 | Uchii | H01H 33/905 |
| | | | | 218/63 |
| 8,779,316 | B2* | 7/2014 | Drews | H01H 33/74 |
| | | | | 218/51 |
| 2011/0163069 | A1* | 7/2011 | Ohlsson | H01H 33/901 |
| | | | | 218/66 |
| 2013/0168357 | A1* | 7/2013 | Yaginuma | H01H 33/08 |
| | | | | 218/57 |
| 2014/0263187 | A1* | 9/2014 | Yamada | H01H 33/905 |
| | | | | 218/63 |
| 2018/0226214 | A1* | 8/2018 | Kotsuji | H01H 33/88 |

* cited by examiner

COMPRESSED GAS SWITCH

BACKGROUND

Disclosed embodiments relate generally to the field of electrical switches, and, more particularly, to gas insulated switches.

BRIEF SUMMARY

In one aspect, a switch includes a switching chamber, a first electrical contact and a second electrical contact axially disposed within the switching chamber and separated by a contact gap, a tubular guide disposed around at least one of the electrical contacts axially movable between an open position retracted from the contact gap and a closed position bridging the contact gap, a blast cylinder disposed radially outward of the tubular guide and defining a compression volume therebetween, the blast cylinder axially movable in coordination with the tubular guide between the open position and the closed position, an isolating ring coupled to a tubular guide end, and a blast cylinder bottom ring coupled to a blast cylinder end, the blast cylinder bottom ring and the isolating ring configured to engage each other to form a gas seal to prevent a gas from exiting the contact gap into the compression volume when the blast cylinder and the tubular guide are moved to the closed position.

In another aspect, a switch includes a cylindrical switching chamber containing a gas at a pressure greater than atmospheric pressure, a first electrical contact and a second electrical contact axially disposed within the switching chamber, the contacts having respective contact ends spaced apart from each other to form a contact gap therebetween, a blast cylinder disposed within the switching chamber radially outward of and spaced away from the electrical contacts to form a compression volume therebetween, the blast cylinder movable between an open position and a closed position, the blast cylinder includes a blast cylinder bottom ring further includes an inner surface for directing gas in the compression volume radially inward, and a tubular guide disposed around at least one of the electrical contacts within the switching chamber radially inward of the blast cylinder and movable between an open position and a closed position, the tubular guide includes a contact member portion for electrically connecting the contact ends across the contact gap in the closed position and electrically disconnecting the contact ends when at least partially withdrawn from the contact gap in the open position, the tubular guide further includes an isolating ring disposed at a tubular guide end to engage at least a portion of the inner surface of the blast cylinder bottom ring for at least a portion of the blast cylinder's travel from the open position to the closed position to form a gas seal against the blast cylinder bottom to close a compression volume to prevent the gas from exiting the contact gap and flowing into the compression volume when the blast cylinder and the tubular guide are moved to the closed position, and to disengage from the inner surface of the blast cylinder bottom ring for at least a portion of the blast cylinder's travel from the closed position to the open position to open the compression volume to allow the gas to flow into the contact gap from the compression volume when the blast cylinder and the tubular guide are moved to the open position.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may.

It is noted that disclosed embodiments need not be construed as mutually exclusive embodiments, since aspects of such disclosed embodiments may be appropriately combined by one skilled in the art depending on the needs of a given application.

Figure 1:
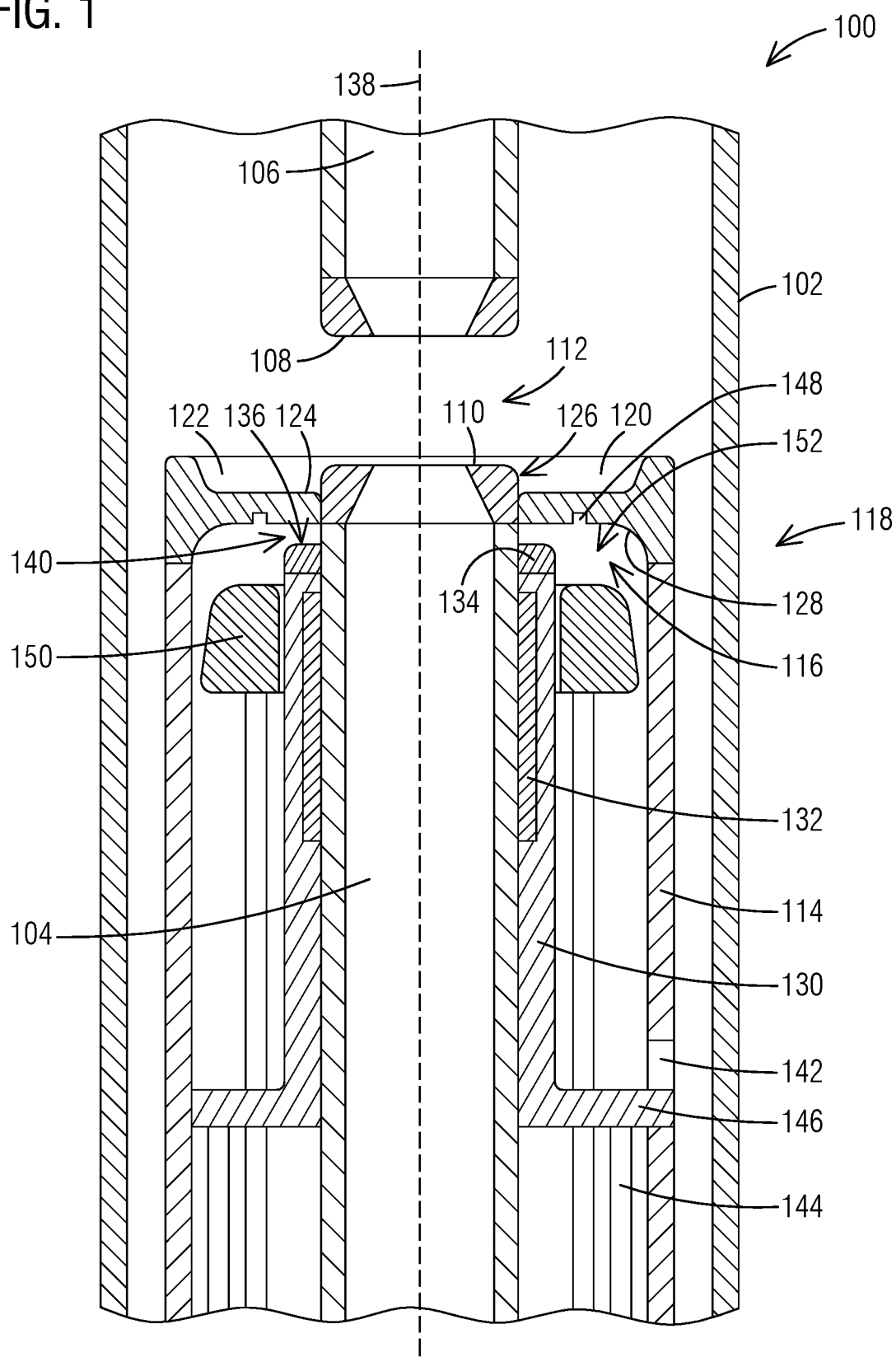
FIG. 1 is a schematic diagram, partially in longitudinal section, of a switch in accordance with one embodiment wherein the switch is depicted in an open position.

FIG. 1 is a schematic diagram, partially in longitudinal section, of a switch 100, such as an alternating current switch or a direct current switch, wherein a first electrical contact 104 and a second electrical contact 106 are depicted in an open, or electrically disconnected, position. The electric switch 100 may be constructed as a compress ed-gas switch 100, or circuit breaker, encased in a switching chamber 102, such as of porcelain, to whose upper end an electrical connector (not shown) may be mounted. The switching chamber 102 may be in the form of a cylinder, and may contain an arc quenching, insulating gas 152, such as sulfur hexafluoride, at a pressure greater than atmospheric pressure, for example, 4 bar. The first electrical contact 104 and the second electrical contact 106 of the switch 100 may be axially disposed within the switching chamber 102, such as along an axis 138, and separated by a contact gap 112. In one aspect, the first electrical contact 104 and the second electrical contact 106 may be hollow for conducting fluid flows, such as an arc quenching gas 152, therethrough. The electrical contacts 104, 106 include respective first contact end 110 and second contact end 108 spaced apart from each other to form the contact gap 112 therebetween. In an embodiment, arc-quenching gas 152 may be present in the contact gap 112.

Figure 3:
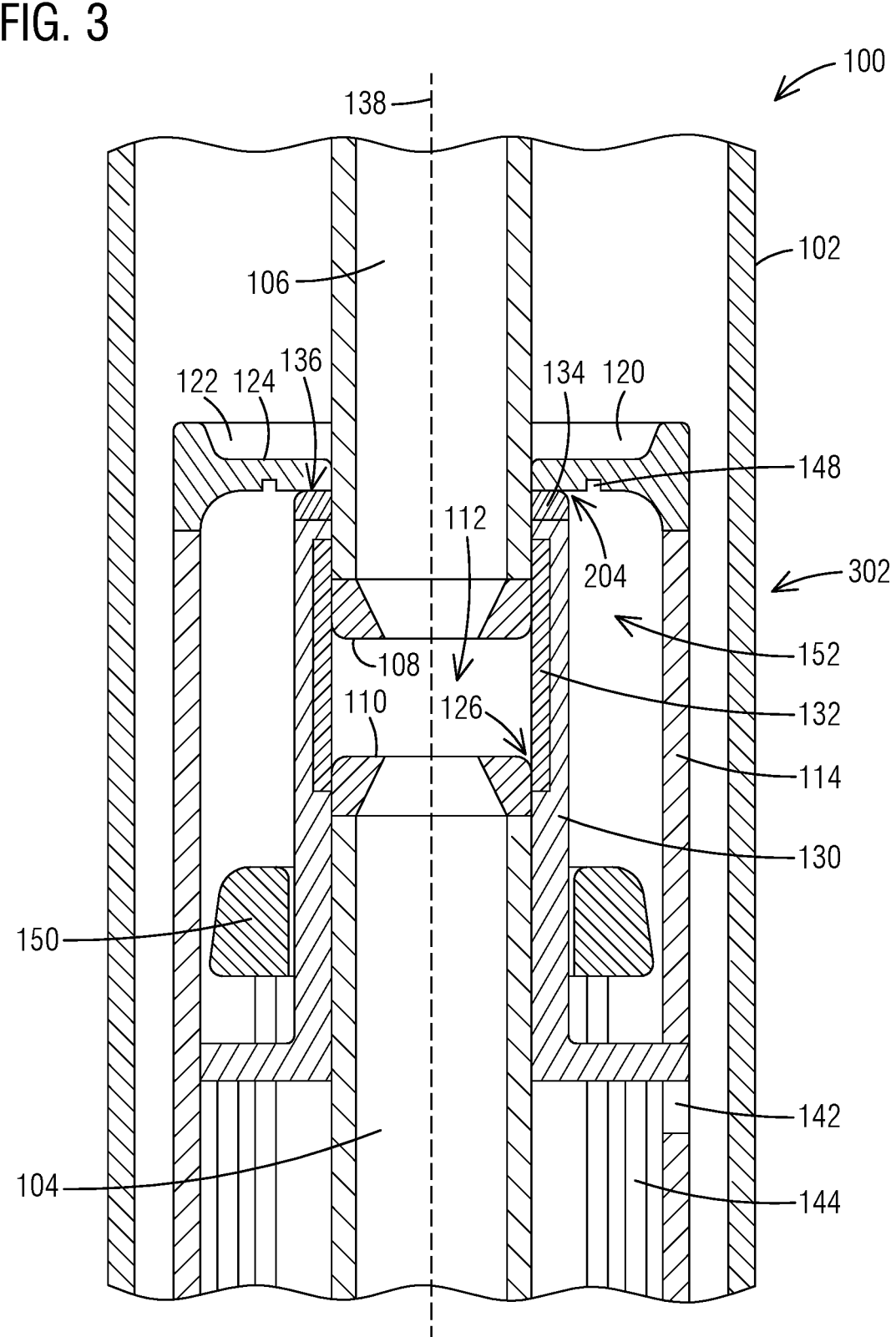
FIG. 3 illustrates an aspect of the subject matter in accordance with one embodiment wherein the switch is depicted in a closed position.

A tubular guide 130 may be disposed around at least one of the electrical contacts 104, 106, axially movable between an open position 118 retracted from the contact gap 112 as shown in FIG. 1, and a closed position 302 bridging the contact gap 112 as shown in FIG. 3. The blast cylinder 114 may be disposed radially outward of the tubular guide 130 to define a compression volume 116 therebetween. In one aspect, the compression volume 116 may contain a pressurized arc quenching gas 152. The blast cylinder 114 may be axially movable in coordination with the tubular guide 130 between the open position 118 and the closed position 302. The switch 100 may also an actuator 144 for axially moving the blast cylinder 114 and the tubular guide 130 between the open position 118 and the closed position 302. The blast cylinder 114 may be configured to move at least partially independently relative to the tubular guide 130, such as by an axially oriented slot 142, wherein the tubular guide includes a projection 146 axially movable within the slot 142 to allow independent axial movement of the blast cylinder 114 and the tubular guide 130 along a portion of reciprocal travel between the closed position 302 and the open position 118. In an aspect, the length of the slot 142 may be selected to correspond to a length of the compression volume gap 140.

In an aspect of the invention, the tubular guide 130 may include an isolating ring 134 coupled to a tubular guide end 136. The isolating ring 134 may be formed from an electrically insulating material, such as an epoxy or polytetrafluoroethylene (PTFE). In another aspect, the tubular guide 130 may include a contact member portion 132 for electrically connecting the electrical contacts 104, 106 when the contact gap 112 is bridged in the closed position 302 of FIG. 3 and electrically disconnecting the electrical contacts 104, 106 when at least partially withdrawn from the contact gap 112. The blast cylinder 114 may further include a blast cylinder bottom ring 120 coupled to a blast cylinder end 122 that includes an inner surface 128 for directing a gas 152 in the compression volume 116 radially inward towards the contact gap 112. In an aspect, the inner surface 128 may include a surface discontinuity 148, such as a circumferential groove, for reducing conduction of a surface current flowing thereon. The blast cylinder bottom ring 120 may be formed from an electrically insulating material, such as an epoxy or polytetrafluoroethylene (PTFE).

Figure 2:
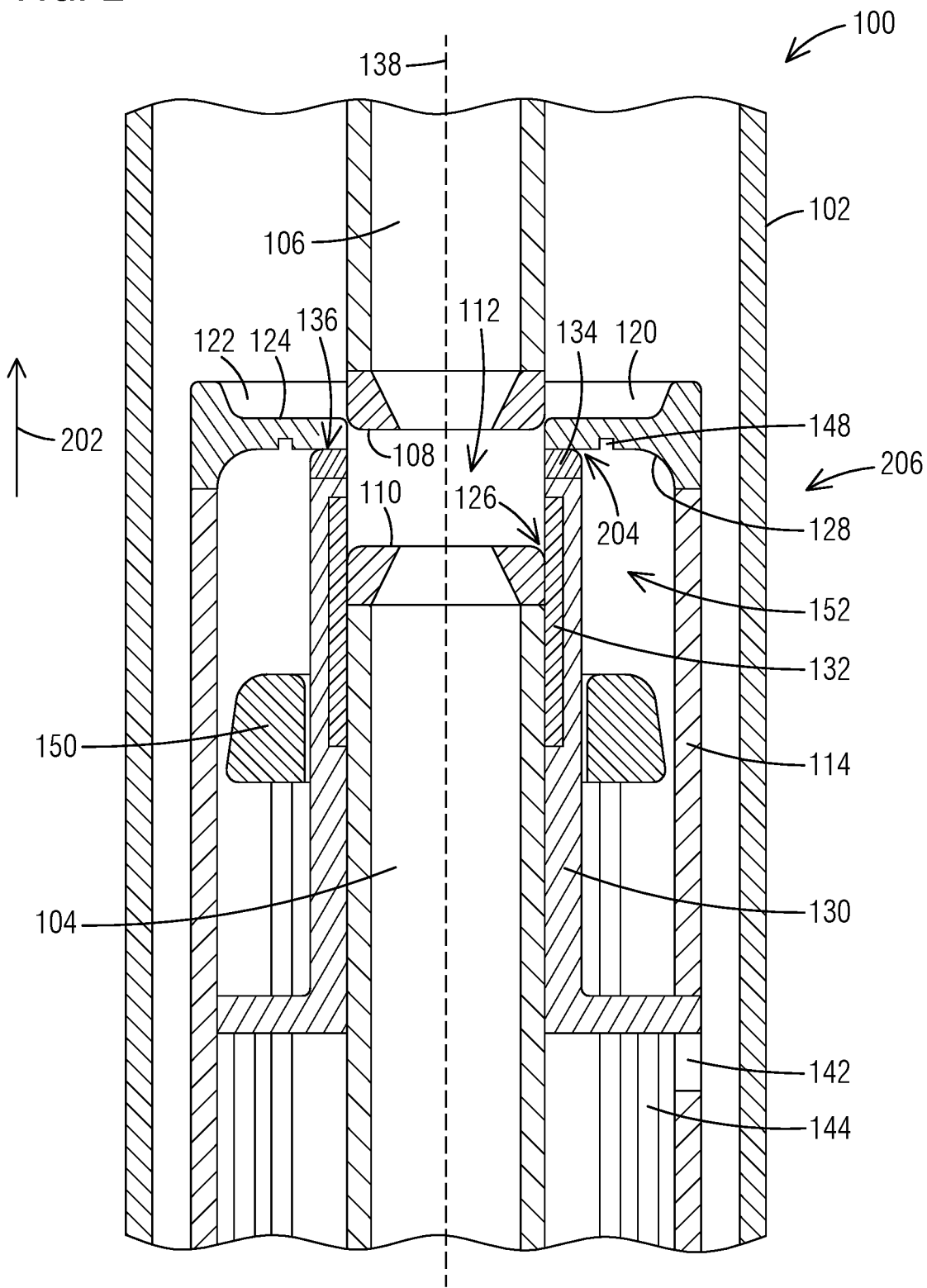
FIG. 2 illustrates an aspect of the subject matter in accordance with one embodiment wherein the switch is depicted in a position during a closing operation.
Figure 4:
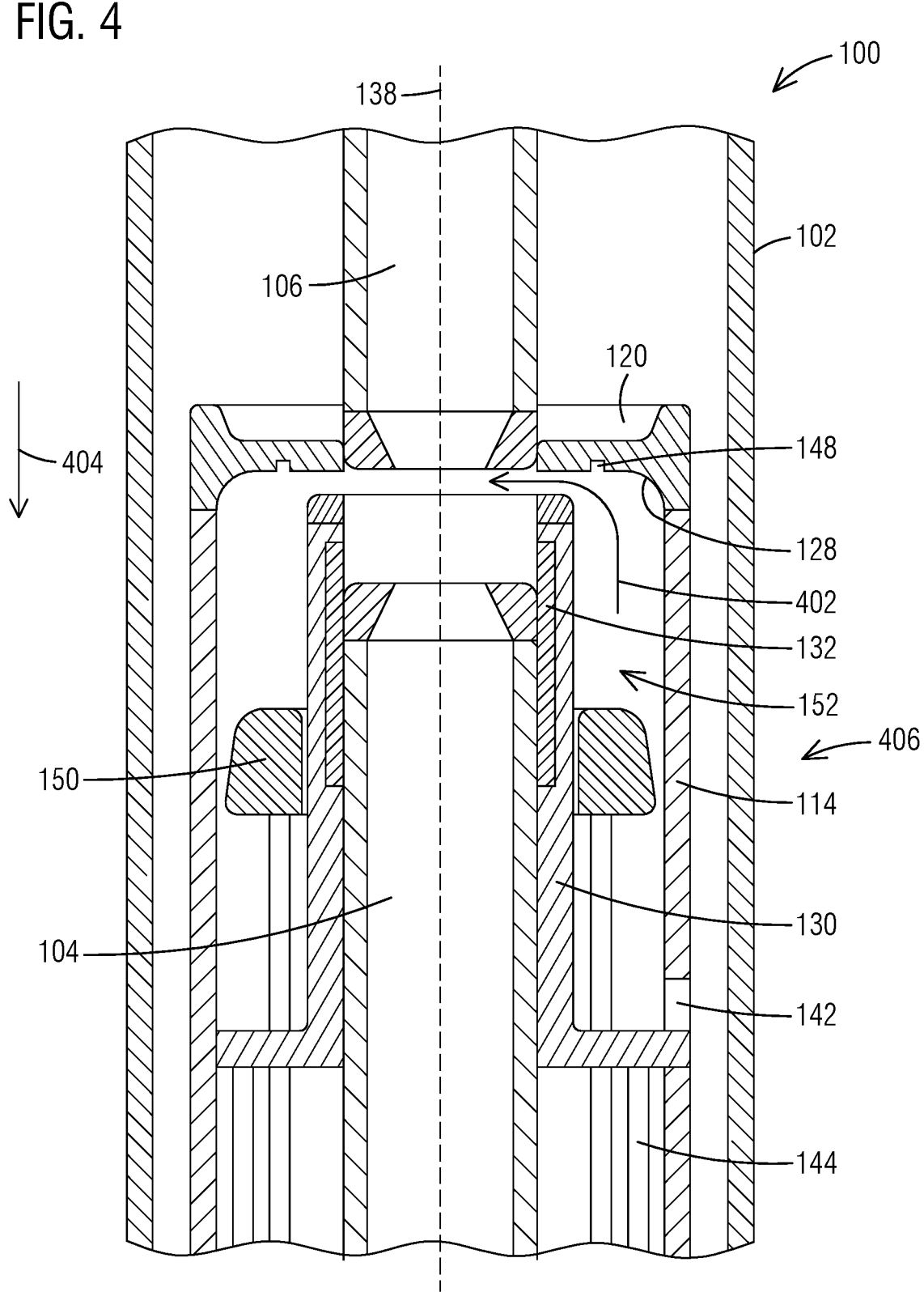
FIG. 4 illustrates an aspect of the subject matter in accordance with one embodiment. wherein the switch is depicted in a position during an opening operation.

The blast cylinder bottom ring 120 and the isolating ring 134 may be configured to engage each other to form a gas seal 204, as shown in FIG. 2 and FIG. 3, to prevent the gas 152 from exiting the contact gap 112 into the compression volume 116 when the blast cylinder 114 and the tubular guide 130 are moved to the closed position 302. In another aspect, the isolating ring 134 may be configured to engage at least a portion of the inner surface 128 of the blast cylinder bottom ring 120, such as a circumferential portion, for at least a portion of the blast cylinders 114 travel from the open position 118 to the closed position 302. In another aspect, the isolating ring may be configured to disengage from the inner surface 128 of the blast cylinder bottom ring 120 for at least a portion of the blast cylinders 114 travel from the closed position 302 to the open position 118 to open the compression volume 116 to allow the gas 152 to flow into the contact gap 112 from the compression volume 116 when opening, as shown in FIG. 4 or in the open position 118 as show in FIG. 1. In an aspect, the blast cylinder bottom ring 120 may include a radially inward mouth portion 124 for forming a blast cylinder seal 126 around a first contact end 110 in the open position 118 and around the second contact end 108 in the closed position 302.

In opening, or breaking, operation depicted in FIG. 4, the tubular guide 130 is pulled, such as by actuator 144, in an opening direction 404 across a stationary piston 150 during the circuit-breaking (opening) motion to make the gas flow 402 of quenching gas 152 available to quench an electrical arc formed in or around the contact gap 112. As depicted in FIG. 4, the tubular guide 130 is moved downward in an opening direction 404 from the closed position 302 of FIG. 3. In so doing, the quenching gas 152 may be compressed because it cannot escape as yet at the start of the circuit-breaking motion until tubular guide 130 has travelled downward to disengage the isolating ring 134 from the blast cylinder bottom ring 120 and open the compression volume gap 140 to the contact gap 112. The quenching gas 152, compressed up to this point, flows from the compression volume gap 140 into the contact gap 112 to assist quenching the arc.

In the closing, or making, operation depicted in FIG. 2, the tubular guide 130 is pushed, such as by actuator 144, in a closing direction 202 so that the isolating ring 134 of the tubular guide 130 first engages the blast cylinder bottom ring 120 to close the compression volume gap 140 and form a gas seal 204 preventing gas 152 from exiting the contact gap 112 into the compression volume 116. Next, the tubular guide 130 and the blast cylinder 114 are moved together in the closing direction 202 to bridge the contact gap 112 and create an electrical connection between the first contact end 110 and second contact end 108 as shown in FIG. 3 while maintaining the gas seal 204 between the isolating ring 134 and the blast cylinder bottom ring 120.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

LISTING OF DRAWING ELEMENTS 100 switch
102 switching chamber
104 first electrical contact
106 second electrical contact
108 second contact end
110 first contact end
112 contact gap
114 blast cylinder
116 compression volume
118 open position
120 blast cylinder bottom ring
122 blast cylinder end
124 mouth portions
126 blast cylinder seal
128 inner surface
130 tubular guide
132 contact member portion
134 isolating ring
136 tubular guide end
138 axis
140 compression volume gap
142 slot 144 actuator
146 projection
148 surface discontinuity
150 piston
152 gas
202 closing direction
204 gas seal
206 partially closed position
302 closed position
402 gas flow
404 opening direction
406 partially open position

What is claimed is:

1. A switch, comprising:
a switching chamber;
a first electrical contact and a second electrical contact axially disposed within the switching chamber and separated by a contact gap,
a tubular guide disposed around at least one of the electrical contacts axially movable between an open position retracted from the contact gap and a closed position bridging the contact gap;
a blast cylinder disposed radially outward of the tubular guide and defining a compression volume therebetween, the blast cylinder axially movable in coordination with the tubular guide between the open position and the closed position;
an isolating ring coupled to a tubular guide end, and
a blast cylinder bottom ring coupled to a blast cylinder end, the blast cylinder bottom ring and the isolating ring configured to engage each other to form a gas seal to prevent a gas from exiting the contact gap into the compression volume when the blast cylinder and the tubular guide are moved to the closed position.

2. The switch of claim 1, wherein the isolating ring is configured to engage at least a portion of an inner surface of the blast cylinder bottom ring for at least a portion of a blast cylinder's travel from the open position to the closed position.

3. The switch of claim 2, wherein the isolating ring is further configured to disengage from the inner surface of the blast cylinder bottom ring for at least the portion of the blast cylinder's travel from the closed position to the open position to open the compression volume to allow the gas to flow into the contact gap from the compression volume.

4. The switch of claim 1, the blast cylinder bottom ring comprising an inner surface for directing the gas in the compression volume radially inward towards the contact gap.

5. The switch of claim 1, wherein the tubular guide comprises a contact member portion for electrically connecting the contacts when the gap is bridged in the closed position and electrically disconnecting the contacts when at least partially withdrawn from the contact gap.

6. The switch of claim 1, wherein the compression volume contains the gas at a pressure greater than atmospheric pressure.

7. The switch of claim 1, the blast cylinder bottom ring further comprising a radially inward mouth portion for forming a blast cylinder seal around a first contact end in the open position and around the second contact end in the closed position.

8. The switch of claim 1, wherein an inner surface comprises a surface discontinuity for reducing conduction of a surface current flowing thereon.

9. The switch of claim 8, wherein the surface discontinuity comprises a groove.

10. The switch of claim 1, wherein the isolating ring comprises an electrically insulating material.

11. The switch of claim 10, wherein the insulating material comprises at least one of polytetrafluoroethylene and epoxy.

12. The switch of claim 1, wherein the blast cylinder bottom ring comprises an electrically insulating material.

13. The switch of claim 12, wherein the insulating material comprises at least one of polytetrafluoroethylene and epoxy.

14. The switch of claim 1, further comprising an actuator for axially moving the blast cylinder and the tubular guide between the open position and the closed position.

15. The switch of claim 1, wherein:
the blast cylinder comprises an axially oriented slot, and
the tubular guide comprises a projection axially movable within the slot to allow independent axial movement of the blast cylinder and the tubular guide along a portion of reciprocal travel between the closed position and the open position.

16. The switch of claim 15, wherein a length of the slot may be selected to correspond to a length of a compression volume gap between the isolating ring and the blast cylinder bottom ring when disposed in the open position.

17. The switch of claim 1, wherein switch is a direct current switch.

18. A switch, comprising:
a cylindrical switching chamber containing a gas at a pressure greater than atmospheric pressure;
a first electrical contact and a second electrical contact axially disposed within the switching chamber, the contacts having respective contact ends spaced apart from each other to form a contact gap therebetween;
a blast cylinder disposed within the switching chamber radially outward of and spaced away from the electrical contacts to form a compression volume therebetween, the blast cylinder movable between an open position and a closed position, the blast cylinder comprising a blast cylinder bottom ring further comprising an inner surface for directing gas in the compression volume radially inward; and
a tubular guide disposed around at least one of the electrical contacts within the switching chamber radially inward of the blast cylinder and movable between an open position and a closed position, the tubular guide comprising a contact member portion for electrically connecting the contact ends across the contact gap in the closed position and electrically disconnecting the contact ends when at least partially withdrawn from the contact gap in the open position, the tubular guide further comprising an isolating ring disposed at a tubular guide end to engage at least a portion of the inner surface of the blast cylinder bottom ring for at least a portion of a blast cylinder's travel from the open position to the closed position to form a gas seal against the blast cylinder bottom to close the compression volume to prevent the gas from exiting the contact gap and flowing into the compression volume when the blast cylinder and the tubular guide are moved to the closed position, and to disengage from the inner surface of the blast cylinder bottom ring for at least the portion of the blast cylinder's travel from the closed position to the open position to open the compression volume to allow the gas to flow into the contact gap from the compression volume when the blast cylinder and the tubular guide are moved to the open position.

19. The switch of claim 18, the blast cylinder bottom ring further comprising a radially inward mouth portion for forming a seal around the first contact end in the open position and around the second contact end in the closed position.

\* \* \* \* \*